Sept. 11, 1923.  
R. N. McCLURE  
DIRECTION INDICATOR FOR MOTOR VEHICLES  
Filed Nov. 14, 1921   3 Sheets-Sheet 1
1,467,487
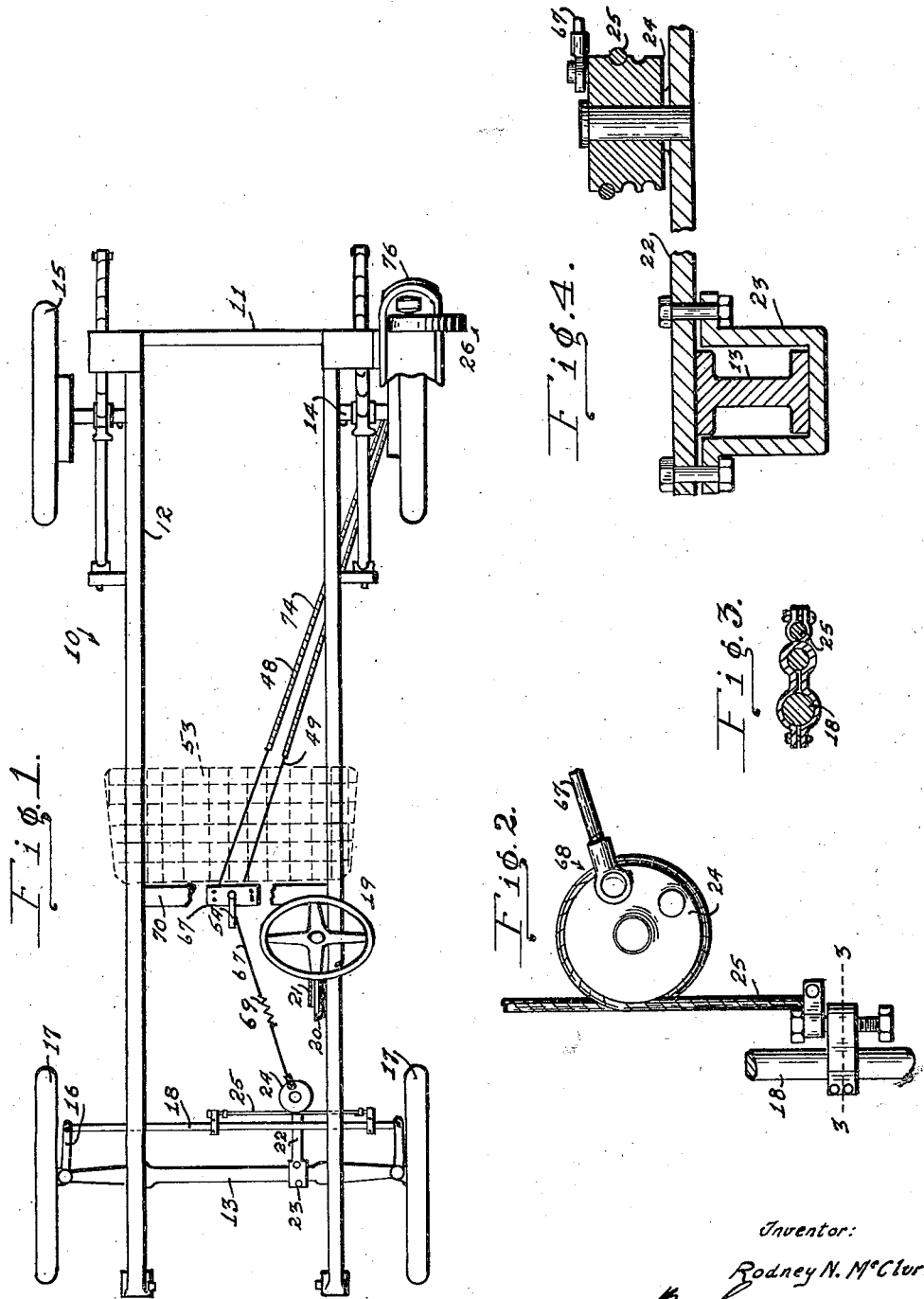
Inventor:  
Rodney N. McClure.  
Attorney.

Sept. 11, 1923.
R. N. McCLURE
DIRECTION INDICATOR FOR MOTOR VEHICLES
Filed Nov. 14, 1921
1,467,487
3 Sheets-Sheet 2
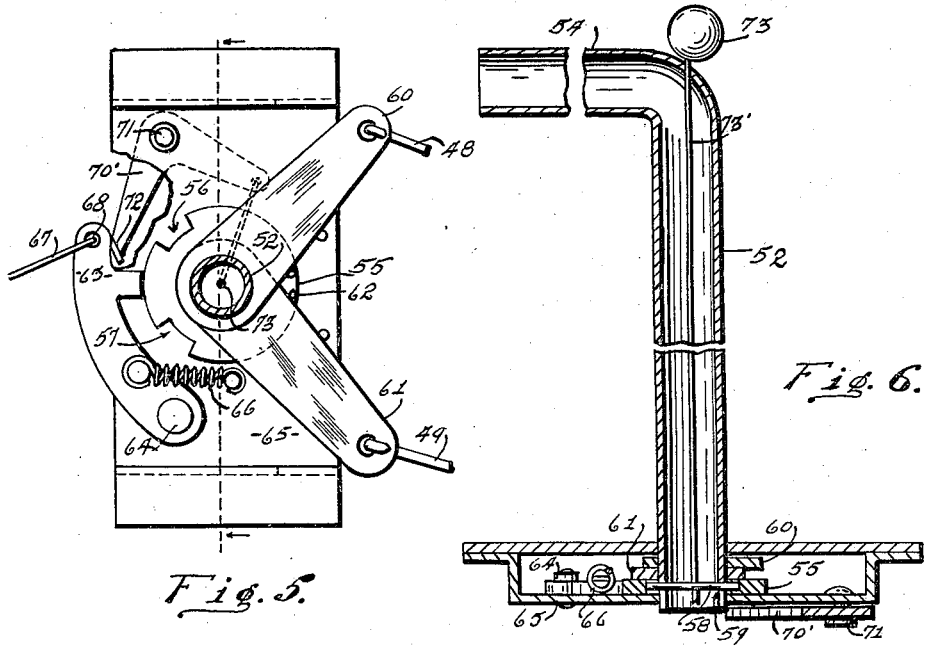
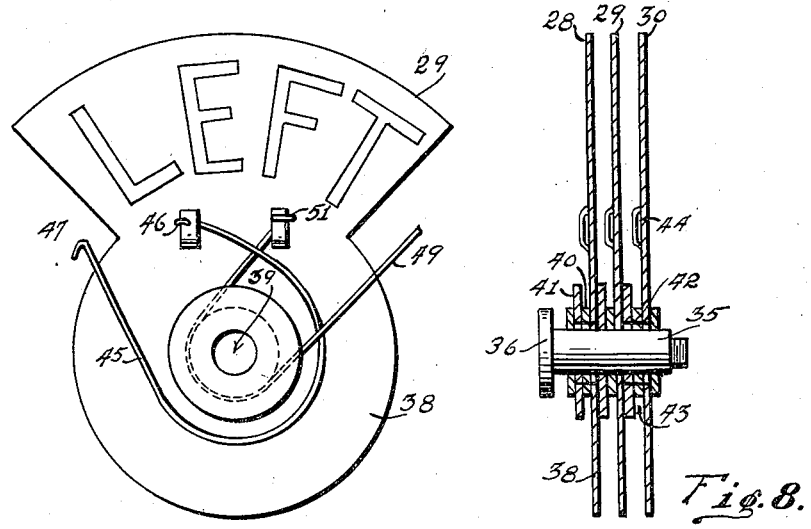
Inventor:
Rodney N. McClure.

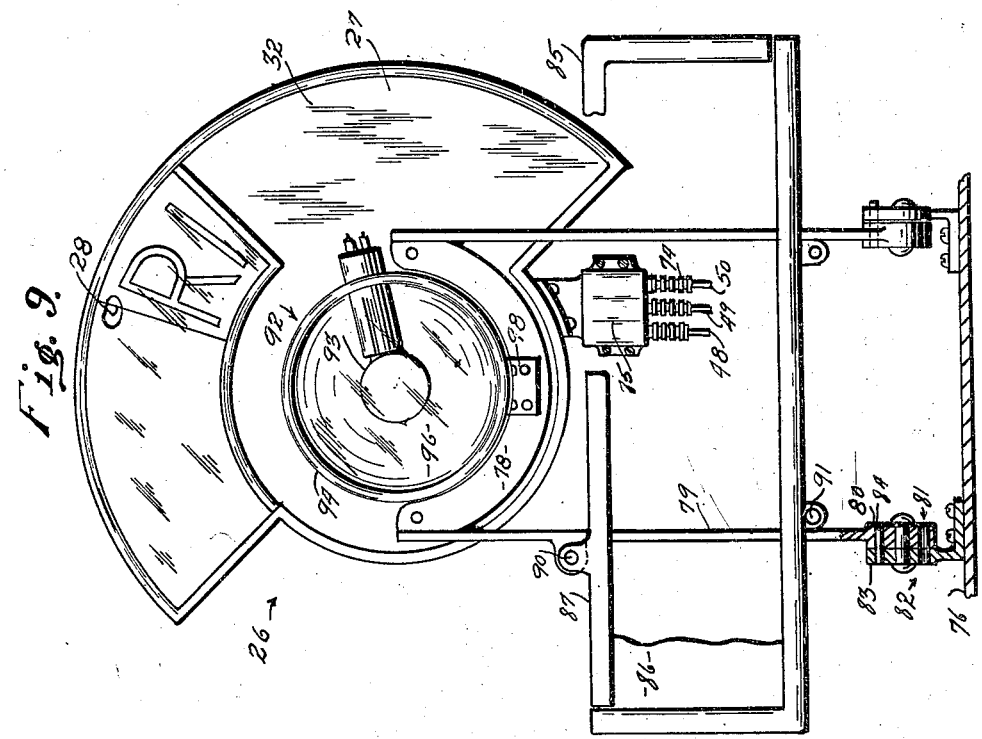
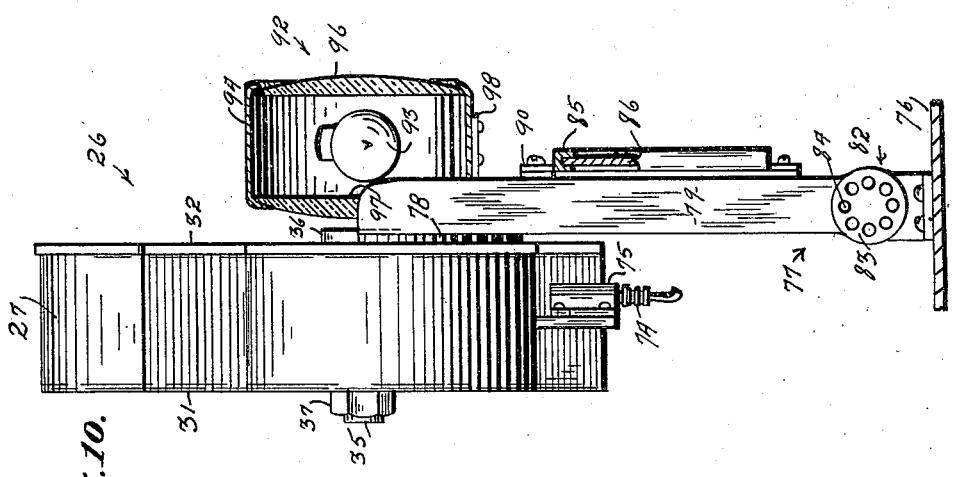

Patented Sept. 11, 1923.

1,467,487

UNITED STATES PATENT OFFICE.

RODNEY N. McCLURE, OF LOS ANGELES, CALIFORNIA.

DIRECTION INDICATOR FOR MOTOR VEHICLES.

Application filed November 14, 1921. Serial No. 515,108.

*To all whom it may concern:*

Be it known that I, RODNEY N. MCCLURE, a citizen of the United States, and a resident of Los Angeles, in the county of Los Angeles and State of California, have invented new and useful Improvements in Direction Indicators for Motor Vehicles, of which the following is a specification.

This invention relates to direction indicators for motor vehicles and pertains more particularly to a direction indicator that is set by the driver of the vehicle to indicate the direction in which the vehicle is about to be turned; but which is automatically released upon the vehicle having subsequently assumed a straight course.

My invention has for its principal objects to provide a direction indicator of the above type that is of simple construction and attractive appearance and which may be readily attached to a motor vehicle without appreciable time and labor.

It will be understood in the consideration of the invention that manually operated direction indicators as usually constructed, after being set by the driver before making a turn must subsequently be released by the driver immediately after making the turn. It is found however that the driver frequently forgets to perform the latter operation with the result that the drivers of vehicles forward and to the rear of the vehicle are confused by the signal and accidents may result. It is therefore an object of this invention to provide means whereby the return of the steering wheel to its normal position will act to return the indicator to inoperative position, without thought or effort upon the part of the driver.

Inasmuch as the invention contemplates the use of a direction indicator upon practically any type of motor vehicle without altering the structure in any way it is another object of my invention to provide a construction whereby the device is readily installed and is apparent to observers both to the front and rear of the vehicle.

Another object of the invention is to provide a construction in direction indicators embodying a segmental casing carrying segmental indicia bearing vanes rotatably mounted upon a common shaft; the vanes being normally disposed within the casing and adapted to be advanced by a partial rotation so as to become apparent; so that the operation of setting the signals requires the minimum of energy and the operating and releasing mechanisms may be of simple and light construction.

A further object of the invention is to provide an attractive signal housing in which the signal vanes when brought into view are readily apparent in day light and are illumined in a novel manner so as to be apparent a substantial distance at night.

With these and other objects in view, as will appear hereinafter, I have illustrated and will describe an embodiment of my invention which I may alter within the scope of the appended claims without departing from the spirit of the invention.

In the embodiment shown, I provide a segmental housing containing indicia bearing signal vanes of segmental form which when reposing in normal position within the segmental casing are not apparent. The vanes are commonly mounted on a rotatable shaft so that upon a partial revolution of any one of the vanes, it is brought into view with a minimum expenditure of energy. Each vane is provided with an operating cable coiled about a hub thereon to impart a partial rotation to the vane, and the cables are connected to a manually operated lever disposed adjacent the driver's seat, and formed with a forwardly pointing handle so that upon the handle being turned toward the right the corresponding signal vane will be brought into view. I provide a simple locking mechanism whereby the handle becomes means to hold the vane in apparent position. Operatively connected with the locking mechanism is a releasing mechanism operative upon movement of the equalization bar, common to motor vehicles, so that upon the front wheels of the vehicle being subsequently turned, after setting the signal vane, to cause the vehicle to travel again in a straight line, the latter mechanism releases the vane and allows it to be drawn back into normal position with the casing, by means of a light spring provided for each vane. For the purpose of excluding dirt and moisture from the vanes I provide an improved form of casing having a translucent panel through which the vanes are apparent when moved into operative position. To facilitate illumination of the casing, to render it apparent at night, I provide an improved lighting means serving jointly to illuminate the casing as well as serving as a tail-light for the vehicle.

I have illustrated my invention in the accompanying drawings, in which:

Fig. 1 is a plan view of a motor vehicle chassis showing the invention applied thereto.

Fig. 2 is an enlarged plan view of a releasing mechanism operatively connected to the equalization bar.

Fig. 3 is a view in section as seen on line 3—3 of Fig. 2.

Fig. 4 is a view in section seen on line 4—4 of Fig. 1.

Fig. 5 is a plan view of a releasing mechanism with the upper portion of its housing removed.

Fig. 6 is a view in vertical section seen on the line 6—6 of Fig. 5.

Fig. 7 is a view in elevation of one of the signal vanes.

Fig. 8 is a view in vertical section of an assembly of three indicia bearing signal vanes commonly mounted on a single shaft, showing the manner in which they are assembled in their segmental casing.

Fig. 9 is a view in elevation of the signal casing showing one of the signals in operative position, the view being that seen to the rear of a vehicle on which the device is employed.

Fig. 10 is a view in vertical section seen on the line 10—10 of Fig. 9.

Referring now particularly to Figs. 1 to 5 inclusive, 10 indicates the chassis of a motor vehicle, comprising end members 11 and side members 12, a front axle 13 and a rear axle 14, the latter having the wheels 15 rotatably mounted thereon and the forward axle carrying the usual steering knuckles 16 which are mounted to turn thereon in the usual manner, and carry the front wheels 17 and 17. Interconnecting the steering knuckles 16, is an equalization bar 18 which travels in substantially a lateral path and is advanced and retracted by the steering wheel 19 and the steering shaft 20, carried in the steering post 21. The movement of this bar to the right as is well known, causes the front wheels to turn jointly so that the vehicle turns to the left and vice versa. A bracket 22 is fixed to the front axle 13 and is formed at its forward end with a clamp 23 so that it may be readily attached thereto. A rotatable drum 24 is mounted on the end of this bracket rearwardly of the equalization bar. As a means for operating the drum to cause it to make a partial revolution upon movement of the bar a cable 25 is passed in one or more turns about the drum and is fixed at each end to a corresponding knuckle and to the drum as at 24'. The drum is of such diameter and the cables are attached to the knuckles at such a point that normal movement of the bar turns the drum a partial revolution of about 120 degrees. Obviously the drum will be returned to normal position with the return of the wheels, inasmuch as the knuckles move simultaneously and therefore, when one knuckle moves the drum in one direction the return movement of the bar will result in the other knuckle returning the drum to normal position.

The signaling mechanism which is indicated by 26 comprises essentially a segmental casing 27 in which are rotatably mounted signal vanes 28, 29, and 30. One vane 28 is provided on each side with the indicia "Right" as shown and the other with the indicia "Left". The casing 27 is formed of two segmental walls 31 and 32 spaced apart. One wall 31 is formed with lugs 32 and 33 protruding therefrom at right angles and formed with their ends bent as at 34 to extend parallel with the wall. These lugs together form a means for holding the wall 31 in fixed spaced relation to the wall 32. The lugs 32 and 33 serve also as stops for the vanes to limit their motion in either direction, the vanes normally resting against the stop 32, but when moved into signalling position abut the stop 33. The casing is provided with a transverse shaft 35 formed at one end with an enlarged head 36 abutting the outer face of the wall 31 and the other end of the shaft is provided with a nut 37 adjacent the wall 32. Upon tightening the nut the two walls of the casing are more securely held.

The signal vanes as shown particularly in Figs. 7 and 8 are formed with a central hub portion 38 integral therewith which is provided with a central opening 39, so that the vanes may be rotatably mounted upon the shaft 35. To provide ample bearing surface an annular bearing member 40 is provided on each vane disposed contiguous with the inner side thereof and adjacent the bearing is positioned a larger disc member 41, which together with the bearing is held fixed to the vane by means of rivets 42. A space 43 is thus provided between the bearing and disc member. When a plurality of the vanes are mounted within the casing in the manner shown they are held spaced apart a suitable distance thereby.

Each vane in the process of being formed from a sheet of metal is provided with slots 44 which are formed by piercing the metal. A length of spring wire 45 is provided for the purpose of holding the vanes yieldably against the stop 32. One end 46 of this spring wire is hooked in the slot and the other end 47 is hooked over the lug of the casing. It will be observed that the lug serves not only to provide rigidity to the casing but also provides a means for detachably securing the spring wire thereto, to facilitate rapid assembly or replacement. As a means for imparting movement to each vane operating cables 48, 49, and 50 are provided which are fixed at one end, as at 51 to the slot in the vane and thence around the bearing member in the space 43.

The vanes may be moved into visible position by drawing the corresponding cable outward and obviously any suitable operating means can be provided at a point convenient to the driver for operating the signals independently to move them into visible position. For this purpose I have provided a vertical shaft 52 extending upward adjacent the driver's seat 53 and provided with a handle 54 normally pointing forwardly in alignment with the major axis of the vehicle, in which position the device is inoperative and the signal vanes are not apparent. To the lower end of this shaft, which passes downward thru the floor boards, not shown, is fixed a disc 55 to rotate therewith. The disc is provided with two recesses 56 and 57 spaced about 120 degrees apart. To facilitate rapid assembly the disc is fixed to the shaft by means of a pin 58 passing transversely therethrough and extending from each side to enter a key-way 59.

The operating cables 48 and 49 are connected to levers 60 and 61 respectively, which levers are adapted to be independently moved by turning the shaft a partial revolution in the corresponding direction. For this purpose the levers are each loosely mounted upon the shaft adjacent the disc 55. The disc is provided with pins 62 one in contact with the margin of a corresponding lever. It is apparent now that upon the shaft being turned to the right the lever 60 will be advanced in that direction and will act to operate the vane 28 connected thereto by the cable 48. During this operation the other lever being freely mounted will not be moved by the shaft.

In order that the signal vane may be held in operative or apparent position, I provide a means for holding the shaft locked in the position to which it is turned. The said means is here shown as consisting of a pawl 63 adapted to be drawn into a recess by means of a spring 66 fixed to the bottom of a housing 65. The pawl is pivoted thereto as at 64. It is apparent that upon the pawl entering a recess to lock the signal in position it will remain apparent in the casing until released. To render the releasing thereof automatic, the pawl is connected to the drum 24 as at 68 by a cable 67. Upon the front wheels of the vehicle being turned the drum will make a partial revolution as explained thus retracting the cable 67 to draw the pawl from engagement with the recess. A spring 69 is interposed in the cable 67 to permit of excess motion of the cable without injury to the pawl or locking mechanism. The housing 67 is adapted to be mounted at the lower side of the floor boards, not shown, and is preferably secured to a transverse strut 70 common to motor vehicle chassis.

It will be understood that the handle 54 is normally moved, to the direction contemplated by the driver, while the vehicle is moving in a straight line. Under the latter condition the recesses are out of alignment with the pawl but the spring 66, holds the pawl yieldably against the disc 55. Upon the disc moving so that the recess comes in alignment with the pawl the latter is drawn therein by the spring. Subsequently, after the vehicle has turned a corner and the driver has turned the steering wheel so that the front wheels are brought into straight ahead position, the simultaneous movement of the equalization bar will impart a partial rotation to the drum, as explained, thus releasing the signal and allowing it to return to its normal position within its casing. Should it occur, however, for any reason, that the driver desires to return the signal vane to inoperative position before it would automatically do so, I have provided a bell crank 70 pivoted as at 71 to the lower side of the housing 65 and formed with a vertically extending portion 72 abutting the pawl. To this bell crank is fixed a length of wire 72' passing upward through the vertical shaft and provided with a pawl 73 at the upper end thereof, normally held in contact with the outer surface of the shaft by virtue of the tension of the spring 66 holding the pawl. By lifting this pawl it is apparent that the bell crank will be advanced to retract the pawl from the recess, so that the signal may be released before the wheels have assumed a straight course.

To protect the cables 48, 49 and 50 against abrasion from contact with parts of the vehicle they are passed through flexible conduits 74 which are fixed to the signal vane casing by means of a clip 75 fixed thereto. The casing is adapted to be mounted on a fender or mud guard 76 or other part to the rear of the vehicle, and is provided with an adjustable standard 77 comprising an arcuate portion 78 extending continuous with the casing and fixed thereto, and a pair of vertically extending portions 79 terminating at their lower ends in a circular portion 80 provided with a plurality of drilled holes 81 arranged in the circular path thereon. A bracket 82 is provided for each vertically extending portion and is formed with a circular portion 83 corresponding in diameter to the portion 80 and provided with a pin 84 adapted to be inserted in any one of the drilled holes 81 to facilitate adjusting and holding the casing at any suitable angle relative to the part of the vehicle upon which it is mounted.

To the vertically extending portions is fixed a license plate bracket 85 for the purpose of holding a license plate 86 such as carried on all motor vehicles, in apparent position immediately below the signal casing. This license plate holder is formed of two similar portions 87 and 88 formed with a channel 89. The portion 87 is normally riveted to the standard as at 20, and the portion 88 is detachably secured as at 91 thereto. It is apparent that a license plate may be readily inserted or removed from the holder by detaching the portion 88.

For the purpose of illuminating the signal casing and the license plate, I provide a light 92 in which is disposed the usual type of electric lamp 93. The light comprises essentially, an annular casing 94 provided with fluted lenses 96 and 97 disposed respectively at each end thereof. The casing is held a short distance to the rear of the signal casing by means of a clip 98 secured to the arcuate portion 78 of the standard, and is of sufficient length to hold the light casing a short distance from the signal casing, so that light emanating through the lens 97, which are preferably of clear glass, will fully illume the signal vanes when brought into view. The lens 96 is preferably colored red and serves as the usual tail-light for the motor vehicle.

It will be observed that the arrangement of the lenses shown tend to prevent the accumulation of dust upon their surfaces, inasmuch as they are vertically disposed and efficient illumination of the signal and license plate is assured. For the purpose of excluding dust and mud from the interior of the casing, I have provided a glass inclosed portion 92 of segmental form into which the signal vanes are advanced. A closure wall 93 is formed integral with the side wall of the casing and extends substantially 180 degrees around the casing to inclose the space occupied by the signal vanes, as well as the glass inclosed portion of the casing. This closure terminates at 94 adjacent an opening 95 through which the signal vanes move when advanced into operative position. The hub portion of the casing is also provided with a similar closure 96 joining the spaced walls.

The operation of the device is as follows:

A handle 54 normally points forwardly, as shown in Fig. 1 and when the driver of the vehicle desires to convey a signal indicating the contemplated direction in which the vehicle is to be turned, the handle is moved in that direction, for instance, when turned to the right the disc 55 rotating therewith will advance the lever 60 causing the cable 48 to impart a partial revolution to the vane 28, which bears the indicia "Right." The vane is thus advanced until it abuts the stop provided therein in the casing, and is now apparent through the glass inclosed portion of the casing, so that drivers of other vehicles to the rear and the front of the said vehicle will be advised of the contemplated change of direction.

The length of the cable, and the tension of the springs interposed therein is such that the vane is brought against its stop preferably before the movement of the lever is fully completed, in order to assure positive operation. Subsequent turning of the shaft in the same direction, will result in the spring yielding without imparting further motion to the vane. Upon the recess in the disc coming in alignment with the pawl the latter will be drawn therein and hold the signal locked in apparent position, as explained. After the vehicle has turned a corner or the driver has returned the steering wheel to straight ahead position, the simultaneous movement of the equalization bar will impart a partial rotation to the drum, retracting the pawl from engagement with the recess and allowing the spring provided on each vane to return that vane into inoperative position. Upon the driver contemplating a left turn, the handle is moved in that direction and the vane bearing the indicia "Left" is advanced into view and subsequently allowed to return when the wheels are again straightened in the same manner as previously described.

It will be observed that the signal vanes, after being manually advanced into operative position return automatically to inoperative position within the casing, immediately the vehicle is resuming a straight course, and consequently the attention of the driver is not required for this purpose. The vane 30 is provided for conformance with the usual requirements for a signal to convey the driver's intention to stop or to decrease the speed of the vehicle depreciably, such as by applying the service brake. This vane can be provided with any suitable indicia, such as "Stop," (not shown), and after the manner commonly employed its operating cable 50 is connected directly to a foot brake (not shown) or similar control of the car operated by the driver, in the act of bringing the vehicle to a stop.

The signal casing, mounted on a suitable part of the vehicle is adjusted at the correct angle according to the design and other characteristics of the body of the vehicle, and is disposed with the light 92 apparent from the rear of the vehicle.

Whereas, I have shown and described a specific embodiment of my invention, I do not limit myself to the exact details of construction or arrangement of parts shown, but may alter the same within the scope of the appended claims without departing from the spirit of my invention; and whereas, I have referred to the device as applied to motor vehicles and in which the signal vanes are automatically released by movement of the steering mechanism, it is apparent that the device may be applied upon any type of vehicle, such as street cars, and the signal vanes be operatively connected to suitable control levers of the car for setting and releasing the signals upon movement of said controls.

What I claim is:

1. In a direction indicator a pair of signal vanes, a manually operated lever adapted to move one of said signals into operative position when moved in one direction and to operate the other of said signals when moved in the other direction, means whereby said lever becomes locked in either position and means operable upon movement of said steering mechanism to release said locking means.

2. In a direction indicator a pair of segmental signal vanes pivotally mounted to oscillate, a segmental casing over said vanes but open at one side to permit of oscillation of said vanes, yieldable means for holding said vanes in position within said casing, selective means manually operated for moving either of said vanes into signaling position, locking means engaging said selective means to hold said vanes in operative position, a rotatable drum operatively connected to the steering mechanism to be oscillated by movement of the steering wheel, a cable fixed at one end to said drum and at its other end to said locking means whereby movement of the steering mechanism will act to release said locking means.

3. In a direction indicator, a plurality of signal vanes, manually operated means for selectively moving any one of said vanes into operative position, means for locking said operating means to hold an operated signal in operative position, a drum fixed to a stationary part of the motor vehicle, a cable passing around said drum and having each end fixed to a steering knuckle, said drum operatively connected to said locking means whereby movement of the steering mechanism to normal position will act to release said locking means from engagement with said operating means.

4. In a direction indicator, a segmental casing comprising two similar segmental walls, a pair of segmental signal vanes pivotally mounted in said casing and adapted to be advanced into visible position, yieldable means for holding said vanes within said casing, an operating handle positioned adjacent the driver's seat and operatively connected to said vanes, whereby movement of the handle in one direction will operate one vane and movement in the other direction will operate the other vane, a shaft fixed to said handle to be oscillated thereby having a portion formed with a pair of recesses, a pawl adapted to engage a recess when the said shaft is turned, so that an operated vane is held in visible position, and means operable upon movement of the steering wheel to retract said pawl to allow said yieldable means to return said vane to position within the casing.

RODNEY N. McCLURE.

Witnesses:
 ROBT. H. FOLSOM,
 IRENE BREEN.